(12) United States Patent
Yoshida et al.

(10) Patent No.: US 12,321,336 B2
(45) Date of Patent: Jun. 3, 2025

(54) SYSTEM AND METHOD FOR PROVIDING CONTEXT-ADAPTIVE RESOLUTION FOR INDUSTRIAL CONTROL SYSTEM DATA

(71) Applicant: Compressor Controls Corporation, Des Moines, IA (US)

(72) Inventors: Shun Yoshida, Des Moines, IA (US); Michael Lev Tolmatsky, Des Moines, IA (US); Oleksii Olegovych Kolesnyk, Des Moines, IA (US); Dmitry Vaghin, Urbandale, IA (US)

(73) Assignee: Honeywell International Inc., Charlotte, NC (US)

( * ) Notice: Subject to any disclaimer, the term of this patent is extended or adjusted under 35 U.S.C. 154(b) by 897 days.

(21) Appl. No.: 17/165,378

(22) Filed: Feb. 2, 2021

(65) Prior Publication Data

US 2021/0248130 A1    Aug. 12, 2021

Related U.S. Application Data

(60) Provisional application No. 62/971,576, filed on Feb. 7, 2020.

(51) Int. Cl.
*G06F 16/23* (2019.01)
*G05B 19/408* (2006.01)
(Continued)

(52) U.S. Cl.
CPC ....... *G06F 16/2379* (2019.01); *G05B 19/408* (2013.01); *G06F 12/123* (2013.01);
(Continued)

(58) Field of Classification Search
CPC ............... G06F 16/2379; G06F 12/123; G06F 2212/1044; G05B 19/408; G05B 2219/32074; G07C 3/005
See application file for complete search history.

(56) References Cited

U.S. PATENT DOCUMENTS 7,546,240 B2    6/2009    Mehrotra et al.
7,835,931 B2    11/2010   Bayne
(Continued)

FOREIGN PATENT DOCUMENTS

CN    102934092 A    2/2013
EP      1921527 A2    5/2008
(Continued)

OTHER PUBLICATIONS

International Search Report and Written Opinion issued in corresponding International Application No. PCT/US2021/016196, mailed on May 10, 2021, 14 pages.
(Continued)

*Primary Examiner* — Lisa M Caputo
*Assistant Examiner* — Cynthia L Davis
(74) *Attorney, Agent, or Firm* — Paschall & Associates, LLC; James C. Paschall; Anthony Miologos

(57) ABSTRACT

Systems and methods described herein use context-adaptive resolution to achieve lossless transfer of critical industrial control system data. Bandwidth and storage optimization is achieved for time-series data generated or collected by an industrial control system and transmitted through a network to a remote historian system. The control system may be implemented through one or more embedded historians and local historians. The control system continuously processes input data, computes output variables, and generates an event trigger when a set of variables meet pre-defined set of conditions. When there are no active event triggers, the control system publishes time-series data for a pre-defined set of variables at a lower resolution to conserve bandwidth and storage. When an event trigger is activated, the control system publishes recent and current time-series data for a subset of the variables to subscribers at a higher resolution.

12 Claims, 6 Drawing Sheets

(51) Int. Cl.
*G06F 12/123* (2016.01)
*G07C 3/00* (2006.01)

(52) U.S. Cl.
CPC .... *G07C 3/005* (2013.01); *G05B 2219/32074* (2013.01); *G06F 2212/1044* (2013.01)

(56) References Cited

U.S. PATENT DOCUMENTS

| | | |
|---|---|---|
| 7,917,857 B2 | 3/2011 | Baier et al. |
| 7,974,937 B2 | 7/2011 | Baier et al. |
| 8,326,666 B2 | 12/2012 | Caldwell et al. |
| 8,462,681 B2 | 6/2013 | Pochiraju et al. |
| 8,676,756 B2 | 3/2014 | Erickson et al. |
| 9,377,936 B2 | 10/2016 | Lawson et al. |
| 9,647,906 B2 | 5/2017 | Asenjo et al. |
| 9,658,924 B2 | 5/2017 | Erickson et al. |
| 10,275,265 B1 | 4/2019 | Gould et al. |
| 2003/0200022 A1 | 10/2003 | Streichsbier et al. |
| 2009/0089231 A1 | 4/2009 | Baier et al. |
| 2013/0090853 A1 | 4/2013 | Anderson |
| 2016/0098388 A1 | 4/2016 | Blevins et al. |
| 2017/0030953 A1 | 2/2017 | Nelson et al. |
| 2017/0316061 A1 | 11/2017 | Hubauer et al. |
| 2018/0299862 A1 | 10/2018 | Zhao et al. |
| 2021/0116903 A1* | 4/2021 | Bouzon ................ G05B 19/048 |

FOREIGN PATENT DOCUMENTS

| | | | |
|---|---|---|---|
| EP | 3354419 A1 * | 8/2018 | ............ B25J 9/1674 |
| JP | 2000-66718 A | 3/2000 | |
| JP | 2018173824 A * | 11/2018 | |
| WO | 2013007866 A1 | 1/2013 | |
| WO | 2014145442 A1 | 9/2014 | |
| WO | WO-2015073433 A1 * | 5/2015 | ........... E21B 43/128 |
| WO | 2017149051 A1 | 9/2017 | |
| WO | 2019066104 A1 | 4/2019 | |

OTHER PUBLICATIONS

English Translation of Office Action in corresponding Japanese Application No. 2022-547992 dated Sep. 15, 2023.

* cited by examiner

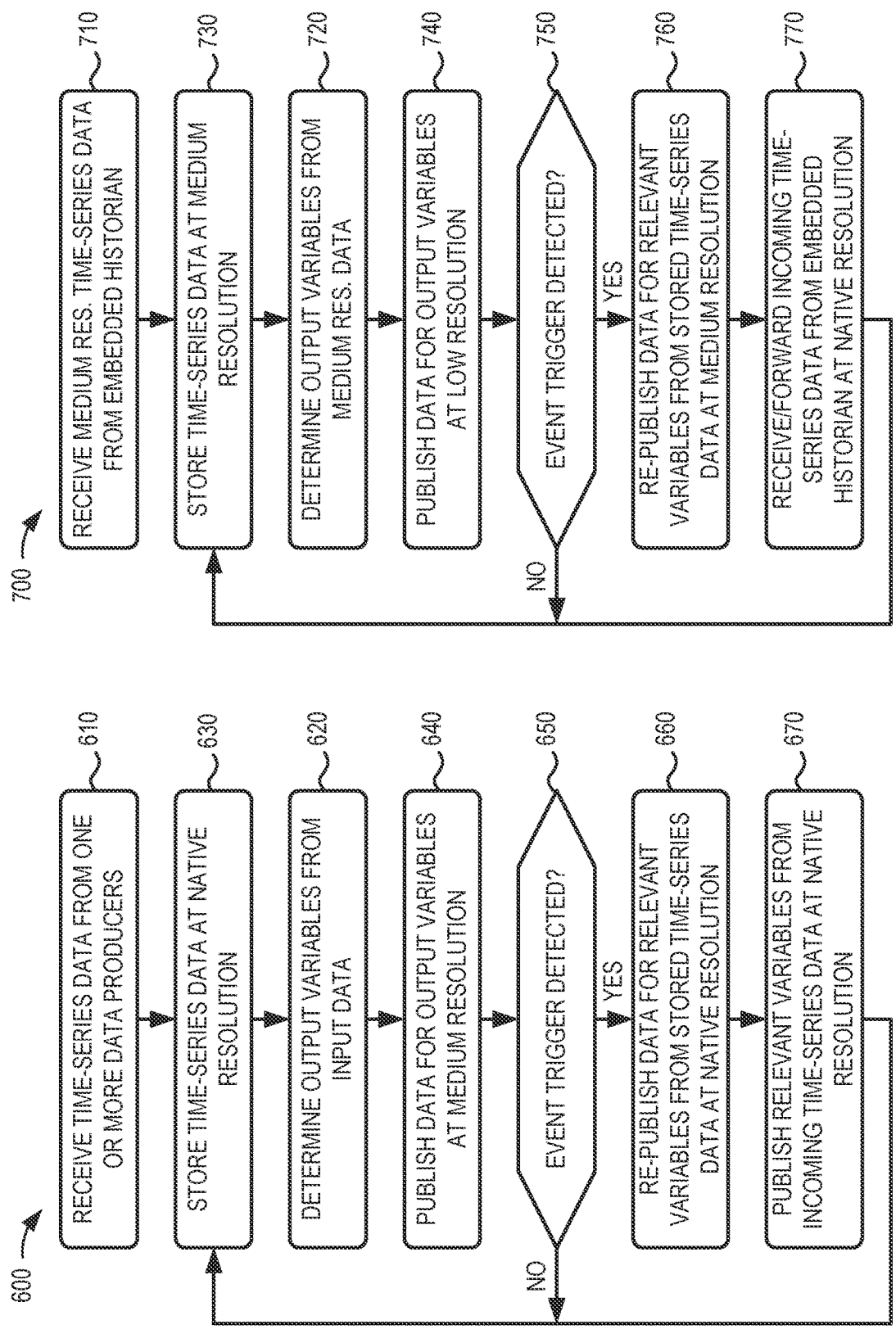

SYSTEM AND METHOD FOR PROVIDING CONTEXT-ADAPTIVE RESOLUTION FOR INDUSTRIAL CONTROL SYSTEM DATA

CROSS-REFERENCE TO RELATED APPLICATION

This application claims priority under 35 U.S.C. § 119, based on U.S. Provisional Patent Application No. 62/971,576 filed Feb. 7, 2020, titled "System and Method for Providing Context-Adaptive Resolution for Industrial Control System Data," the disclosure of which is hereby incorporated by reference.

BACKGROUND OF THE INVENTION

Industrial processes can be extremely complex, and monitoring such processes can generate enormous amounts of data. This data can be essential for historical records, trouble-shooting, and real-time decisions. Thus, data from events that occur in industrial processes must be tracked and stored at a high rate. The data may also need to be accessible to other systems throughout process facilities. Due to this complexity, it is a difficult but important task to provide an event historian system that can quickly and accurately record event data as it occurs and provide results to queries of the stored data in a responsive manner.

BRIEF DESCRIPTION OF THE DRAWINGS

FIGS. 6 and 7 are flow diagram of processes for providing context-adaptive resolution for transfer of control system data, according to implementations described herein.

DETAILED DESCRIPTION OF THE PREFERRED EMBODIMENTS

Figure 1:
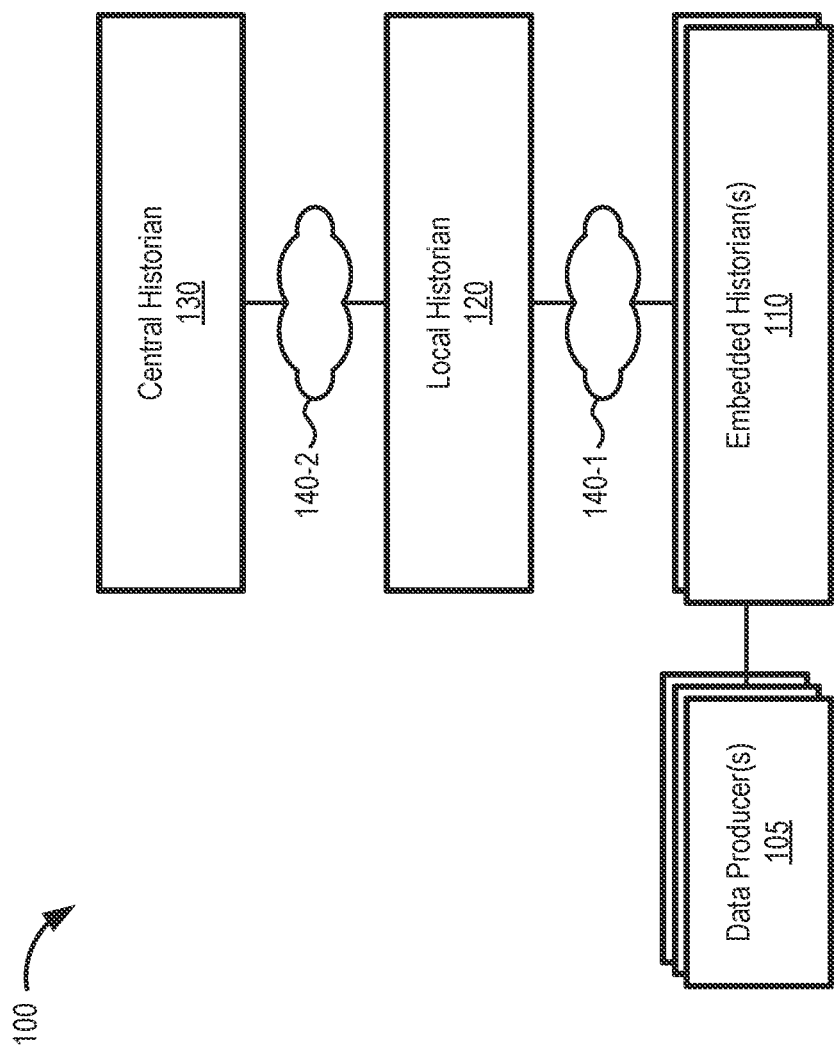
FIG. 1 is schematics of an environment in which systems and methods described herein may be implemented.

The following detailed description refers to the accompanying drawings. The same reference numbers in different drawings may identify the same or similar elements.

Systems and methods described herein relate generally to data reporting for industrial control systems. More particularly, implementations described herein relate to methods and systems that use context-adaptive resolution to achieve lossless transfer of critical industrial control system data. According to implementations described herein, bandwidth and storage optimization is achieved for time-series data generated or collected by an industrial control system and transmitted through a network to a remote historian system.

Industrial Control Systems that are used for continuous process industries, such as various oil and gas facilities, are often accompanied by data historians (e.g., embedded historians or local historians provided in a separate human-machine interface) to capture time-series data for evaluating process anomalies. Sometimes considered analogous to aircraft flight recorders, the availability, integrity, and quality of the time-series data from data historians is critical to conducting a successful post-event analysis, where the event root-cause is identified to prevent future recurrences. Other common use cases of time-series data include periodic process analysis, optimization, and production reporting.

Factors such as equipment types, measurement types, and use cases determine the selection and resolution (e.g., the periodic frequency of data samples) of the variables to be recorded (or "historized"). Some equipment, such as turbomachinery trains, demand much higher resolution for post-event analysis. Because there is a finite amount of storage, bandwidth, and computational resources available, various methods have been introduced to attempt to balance the limitations of these resources with the need for historizing high resolution data. Some of these various methods, as summarized below, have recognized deficiencies.

Use of circular buffers, for example, aims to reduce the storage space and bandwidth by using a volatile memory to buffer control data and selectively archiving the data locally based on a pre-defined set of triggers. This approach is often seen in vibration monitors and safety systems. A limitation associated with a circular buffer is that poor selection and configuration of the triggers can result in permanent loss of potentially critical data.

As another example, swing-door compression techniques analyze received time-series data for factors such as deadband, rate-of-change, etc., in the destination historian. This method, although often sufficient for analysis in low frequency domains, by nature will result in loss of high frequency data components, which could be crucial when analyzing events in electrical, mechanical, as well fluid/thermodynamics domains.

As a further example, real-time data access interfaces dynamically adjust data resolution based on detection of events. Although the adjusted data resolution could help provide higher quality data for the time period following an anomaly detection, real-time data access interfaces do not allow for transferring of preceding data to help understanding of what has led to the event.

To address these deficiencies, as described herein, a control system is configured as a publisher of time-series data that is directed to a data storage system configured as a subscriber. The control system may be implemented through one or more embedded historians and local historians. The control system continuously processes input data, computes output variables, and generates an event when a set of variables meet pre-defined set of conditions. An event can be configured to be a trigger based on user-defined factors such as criticality and operating state. A complex trigger can be created by combining multiple events and conditions.

When there are no active event triggers, the control system publishes time-series data for a pre-defined set of variables at a lower resolution to conserve bandwidth and storage. When an event trigger is activated, the control system publishes recent and current time-series data for a subset of the variables—either pre-defined or dynamically selected based on their correlation to the current event—to subscribers at a higher resolution in the subscribed system.

FIG. 1 is a block diagram of an environment 100 in which systems and methods described herein may be implemented. Environment 100 may include one or more data producers 105, an embedded historian 110, a local historian 120, and a central historian 130. Generally, data producers 105, embedded historian 110, and local historian 120 may be considered a control system, while central historian 130 may be considered a subscriber for the control system. Embedded historian 110, a local historian 120, and a central historian 130 may be connected by one more links 140-1 and 140-2.

Data producer 105 may include a process controller or industrial equipment that generates input data for embedded historian 110. Data producer 105 may include, for example, a sensor (e.g., a pressure sensor, a temperature sensor, a vibration sensor, a flow sensor, etc.), a controller, a monitoring device, a transmitter, or another type of device that creates or reports data.

Embedded historian 110 may include an event historian that stores process input data from data producer 105. In contrast with local historians 120, embedded historians may be considered special purpose historians that reside in a backplane and supply direct interface (e.g., without a transition layer) to data producer 105 (e.g., controllers and/or associated industrial units). Embedded historian 110 may have a direct interface to data producer 105.

Embedded historian 110 may record time-series data from data producer 105 at a highest (or native) resolution down to, for example, the millisecond (ms) level. Embedded historian 110 may include a circular buffer with limited temporal (e.g., chronological) storage. Temporal storage may include, for example, volatile memory, such as static and/or dynamic random access memory. According to an implementation described herein, embedded historian 110 may be configured to forward time-series data to local historian 120 via link 140-1. Additionally, embedded historian 110 may be configured to respond to a specific event by forwarding past and present native resolution data for key parameters associated with the specific event.

Local historian 120 may include a computing device with a high speed data recorder that accepts data from embedded historian 110 and/or data producer 105. Local historian 120 may include a user interface (also referred to as a presentation interface) to present data records. Local historian 120 may receive, for example, a continuous data feed via link 140-1. The received data is recorded at a lower resolution (e.g., a "medium" resolution) than is initially provided to embedded historian 110. For example, while embedded historian 110 may record data at the millisecond level, local historian 120 may initially record data at a 100 ms level. Local historian 120 may include temporal storage including, for example non-volatile memory.

Local historian 120 may resample temporally-recorded data (e.g., at the 100 ms resolution) to an even lower resolution (e.g. a "low" resolution) to facilitate transfer to central historian 130 via link 140-2. For example, local historian may resample data from a 100 ms resolution to a 1 second resolution to conserve bandwidth and memory resources. According to an implementation described herein, local historian 120 may be configured to forward time-series data to central historian 130 via link 140-2. Additionally, local historian 120 may be configured to respond to a specific event by forwarding past and present medium resolution data for key parameters associated with that specific event.

Central historian 130 may include a remote system to store, process, and present data from local historian 120. In some instances, central historian 130 may compile data from multiple sources (e.g., different local historians) for use in post-event analysis, system monitoring, etc. To conserve bandwidth and storage, under normal conditions, central historian 130 receives time-series data for a pre-defined set of variables at a low resolution. As described further herein, in response to an event, central historian 130 may receive higher resolution time-series data. According to an implementation, central historian 130 may compile time-series data with different resolutions for an overlapping period. For example, central historian 130 may compile native resolution data received from embedded historian 110, medium resolution data received from local historian 120, and low resolution data received from local historian 120 for overlapping time periods.

As further illustrated, environment 100 includes communication links 140 between the historian devices (e.g., embedded historian 110, local historian 120, and central historian 130). Links 140 may be used to form a communication path between devices. A historian device may transmit and receive data via a link 140. Link 140-1 may include, for example, a local area network (LAN) connection. Link 140-2 may include, for example, a wide area network, a broadband cellular network, the Internet, etc.

Links 140 may be implemented as a wireless and/or wired (e.g., electrical, optical, etc.) connection. A communication connection between historian devices may be direct or indirect. For example, an indirect communication connection may involve an intermediary device or network element, and/or an intermediary network not illustrated in FIG. 1. Additionally, the number, the type (e.g., wired, wireless, etc.), and the arrangement of links 140 illustrated in environment 100 are exemplary.

Figure 2:
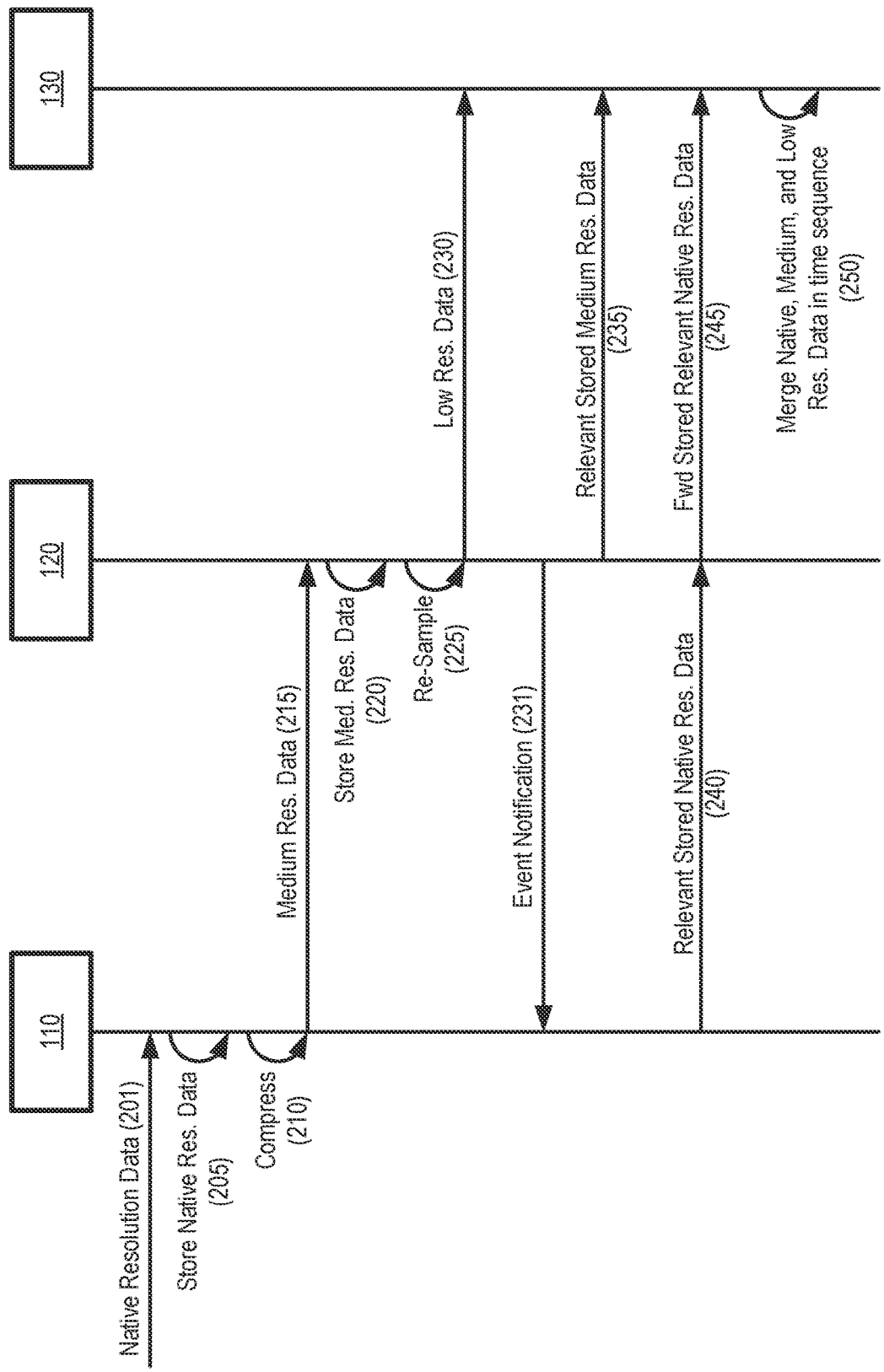
FIG. 2 is a diagram illustrating exemplary communications in a portion of the environment of FIG. 1.

FIG. 2 is a diagram illustrating communications in a portion 200 of environment 100. Portion 200 may include embedded historian 110, local historian 120, and central historian 130.

Referring to FIG. 2, data publication under normal conditions is shown with reference to signals 201 through 230. Embedded historian 110 may receive a continuous sequence of native resolution time-series data 201 (e.g., from data producers 105). Embedded historian 110 may store the native resolution time-series data 201 in a circular buffer (e.g., volatile memory), as indicated at reference 205. Embedded historian 110 may compress/sample native resolution data 201, as indicated at reference 210, and send medium resolution data 215 to local historian 120. Medium resolution data 215 may include fewer variables and/or larger time increments than provided in native resolution data 201.

Local historian 120 may receive the medium resolution time-series data 215 from embedded historian 110. Local historian 120 may store the medium resolution time-series data in non-volatile memory, as indicated a reference 220. Local historian 120 may further compress/re-sample medium resolution data 215, as indicated at reference 225, and send the resulting low resolution data 230 to central historian 130. Low resolution data 230 may include a resampling of medium resolution data 215, with fewer variables and/or larger time increments than provided in medium resolution data 215.

Still referring to FIG. 2, data publication in response to an event is shown with reference to signals 231 through 250. An event may be detected, for example, by local historian 120. In other implementations, an event may be detected by embedded historian 110 or data source 105. In response to detecting an event, local historian 120, for example, may send an event notification 231 to embedded historian 110. Also, in response to detecting the event, local historian 120 may upload a portion of its stored medium resolution data from its non-volatile memory, as indicated by reference 235. The portion of stored medium resolution data 235 may include, for example, a subset of medium resolution data 215. For example, portion of stored medium resolution data 235 may include data for variables that have been predefined as relevant for the event or dynamically selected based on their correlation to the current event. In other implementations, the portion of stored medium resolution data 235 may have been obtained during a defined time period (e.g., a pre-set time prior to the event detection).

In response to event notification 231, embedded historian 110 may upload relevant native resolution data 240 from its circular buffer. In one implementation, the relevant variables of native resolution data 240 may be determined based on instructions in event notification 231. In other implementations, relevant native resolution data 240 may include data for variables that have been pre-defined as relevant for the event. According to another implementation, relevant native resolution data 240 may include all data from the circular buffer of embedded historian 110. In some instances, depending on the data volume for a particular event, native resolution data 240 may be sampled to provide a slightly lower resolution than native resolution data 240. That is, native resolution data 240 may provide a "medium-high" resolution for selected variables. The medium-high resolution is higher than the resolution of medium resolution data 215, but lower than the resolution of native resolution data 201. According to an implementation, embedded historian 110 may continue to forward high resolution data after the event for a set time period. Local historian 120 may receive the relevant native resolution data 240 and forward the relevant native resolution data 240 to central historian 130, as indicated by reference 245.

Central historian 130 may receive the low resolution data 230, the portion of stored medium resolution data 235, and the forwarded relevant native resolution data 245. Central historian 130 may compile this different time-series data with different resolutions for overlapping time periods, as indicted by reference 250. When higher resolution data is available for an overlapping time period that has occurred in the past, central historian 130 can merge higher resolution data (e.g., from stored medium resolution data 235 and/or forwarded relevant native resolution data 245) with previously received lower resolution data to create data of variable resolution, as described further in connection with FIG. 3.

FIG. 2 provides simplified illustrations of communications in environment portion 200 and is not intended to reflect every signal or communication exchanged between devices/functions. For example, communications shown in FIG. 2 may be implemented via a subscription-notification model or a request-response model. Furthermore, while series of signals have been described with regard to the processes illustrated in FIG. 2, the order of the signals may be modified according to other embodiments. For example, some signals may be performed in parallel.

Figure 3:
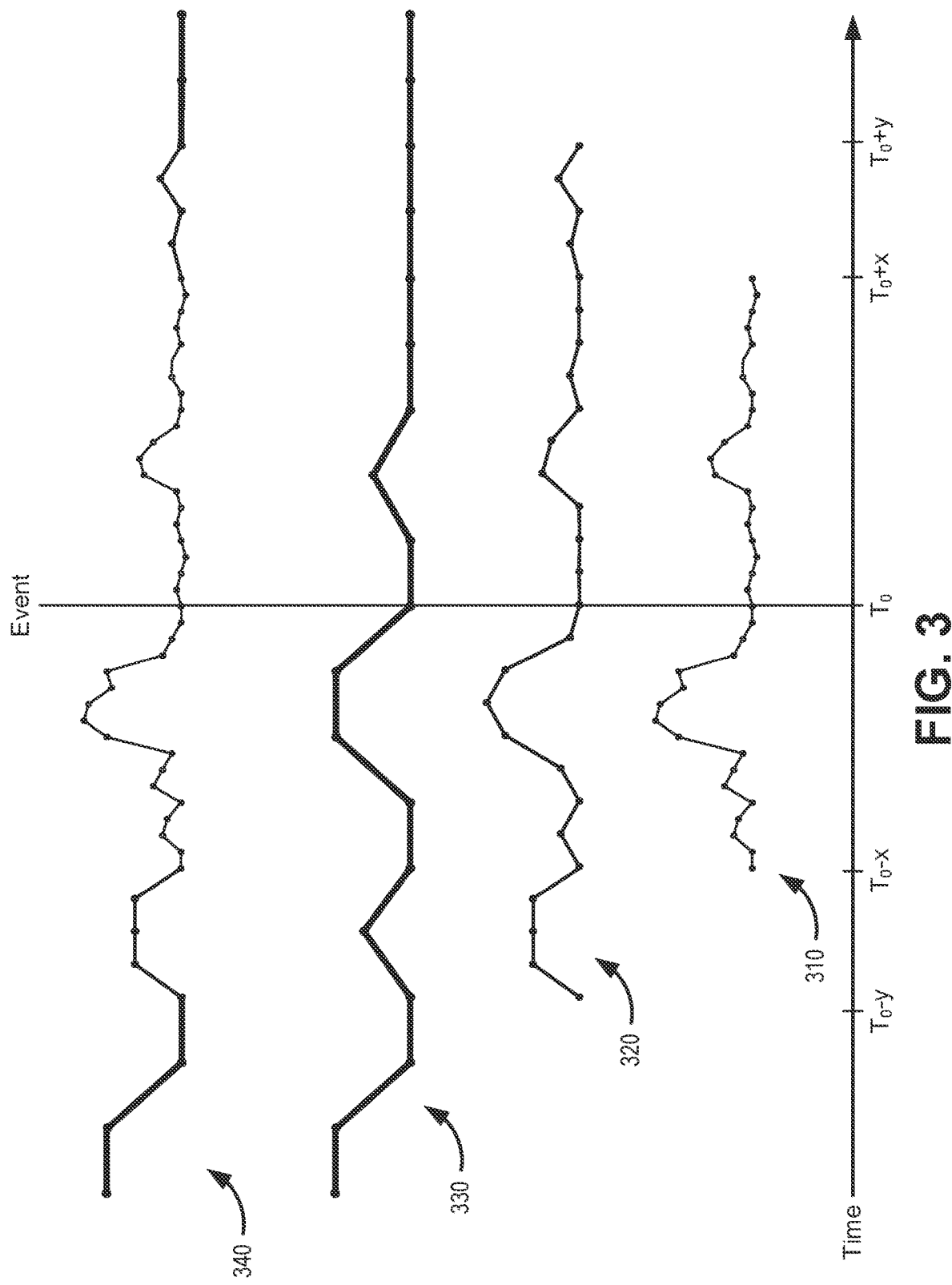
FIG. 3 is an illustration of different data samples that may be provided by the embedded historian, the local historian, and the central historian of FIG. 1.

FIG. 3 is an exemplary illustration of different data samples 310, 320, and 330 that may be provided by embedded historian 110, local historian 120, and central historian 130. Each of data samples 310, 320, and 330 may correspond to a time window defined by an event trigger at time $T_0$. Each individual data point in the time-series data of data samples 310, 320, and 330 may include, for example, a data value and a corresponding timestamp. Embedded historian 110, local historian 120, and central historian 130 may be time synchronized.

Data sample 310 may include, for example, native (or high) resolution time-series data for a period starting at a time $T_0-x$ preceding the event and ending at a time $T_0+x$ after the event, where "x" defines a time window around $T_0$. The value of "x" may be based on a buffer size of embedded historian 110 or the type of event detected. Data sample 310 may, for example, include data resolution of 10 milliseconds (e.g., 10 ms between data points) or less. Data sample 310 may correspond to forwarded relevant native resolution data 245.

Data sample 320 may include, for example, medium resolution time-series data for a period starting at time $T_0-y$ preceding the event and ending at a time $T_0+y$ after the event, where "y" defines a time window around $T_0$. The window for data sample 320 may be larger than the time window for data sample 310. The value of "y" may be a time period based on a memory capacity of local historian 110 or the type of event detected. Data sample 320 may, for example, include data resolution of 100 milliseconds (e.g., 100 ms between data points). Data sample 320 may correspond to the portion of stored medium resolution data 235.

Data sample 330 may include, for example, low resolution time-series data continuously or regularly published by local historian 120. Data sample 320 may, for example, include data resolution of 1 second (e.g., 1 second between data points). Data sample 330 may correspond to low resolution data 230.

Data sample 340 illustrates an adaptive resolution sample that may be compiled by central historian 130 for the event at $T_0$, based on data samples 310, 320, and 330. For example, central historian 130 may use timestamps from data samples 310, 320, and 330 to eliminate redundant data in overlapping periods.

Figure 4:
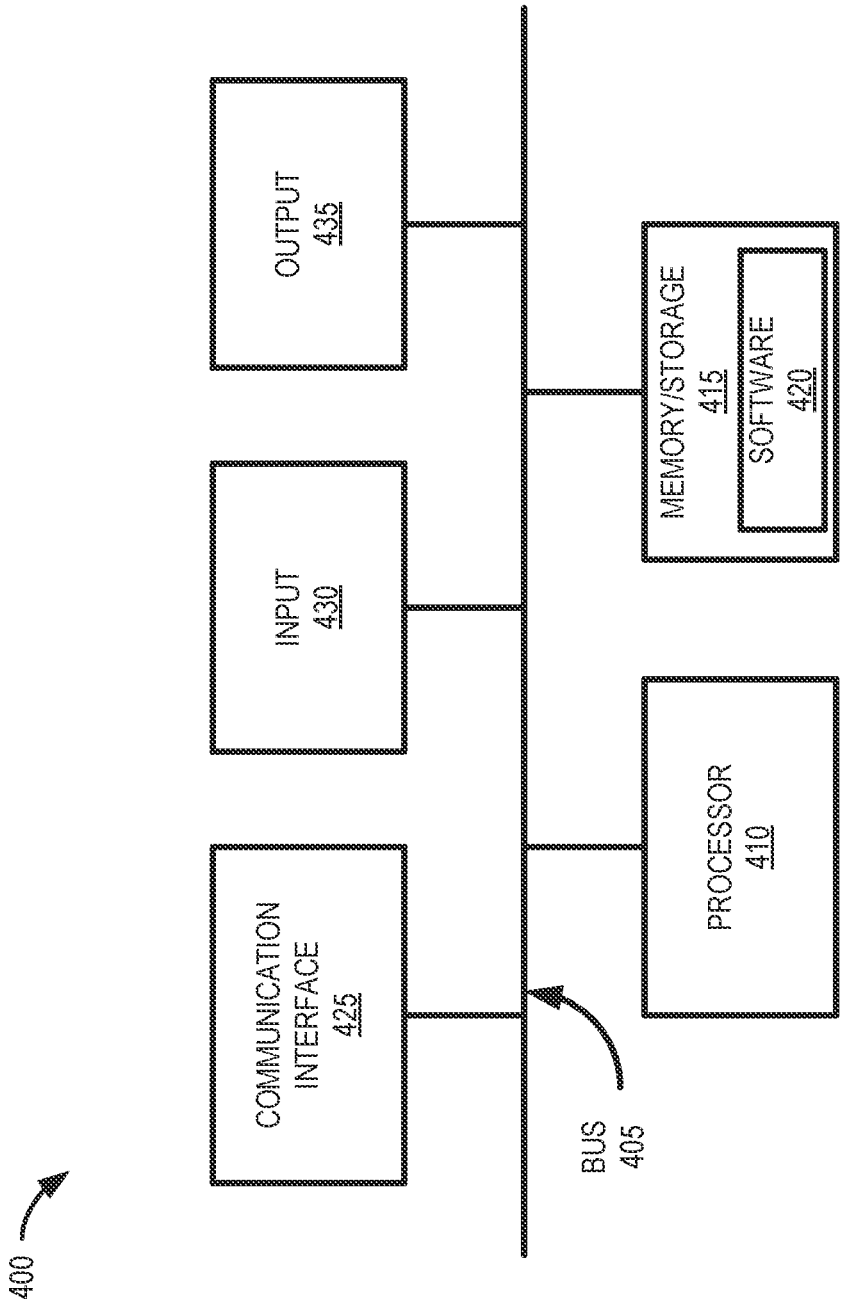
FIG. 4 is a diagram of exemplary components of a device that may be included in the environment of FIG. 1.

FIG. 4 is a diagram illustrating exemplary components of a device 400 that may be included in one or more of the devices described herein. For example, device 400 may correspond to embedded historian 110, local historian 120, central historian 130, and other types of devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. In some instances, memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to local historian 120, software 420 may include an application that, when executed by processor 410, provides a function and/or a process of presenting data (e.g., medium resolution data 215) on a local display. Additionally, for example, with reference to central historian 130, software 420 may include an application that, when executed by processor 410, merges data of different resolutions into an adaptive resolution data sample (e.g., adaptive resolution data sample 340), as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wired and/or wireless interfaces. For example, communication interface 425 may include one or multiple transmitters and receivers, or transceivers. Communication interface 425 may operate according to a protocol stack and a communication standard. In some aspects, communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service based interface, etc.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process and/or a function, as described herein. Alternatively, for example, according to other implementations, device 400 performs a process and/or a function as described herein based on the execution of hardware (processor 410, etc.).

Figure 5B:
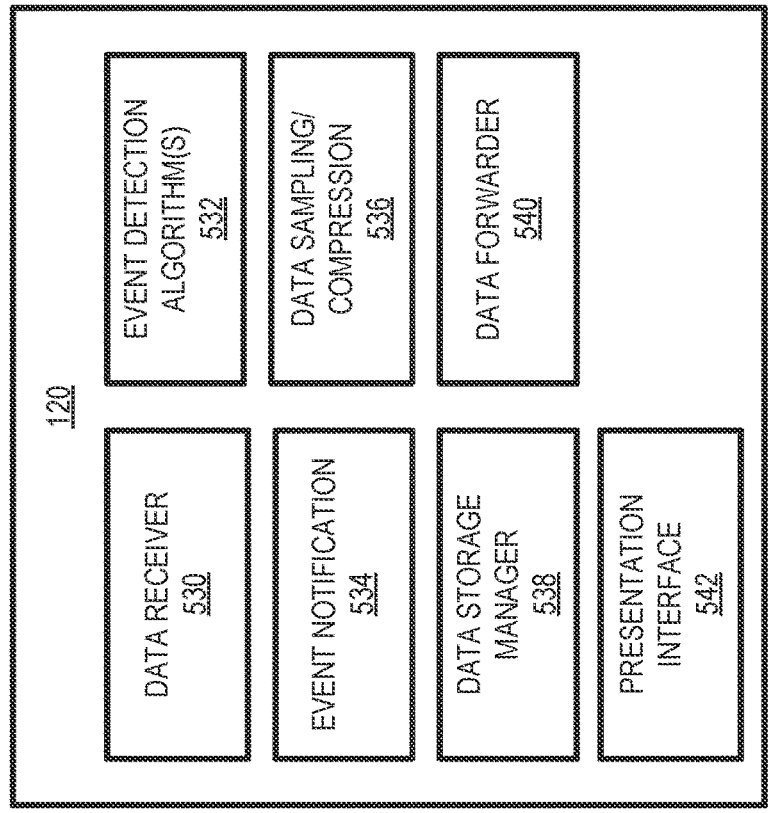
FIG. 5B is a block diagram of logical components of the local historian of FIG. 1.
Figure 5A:
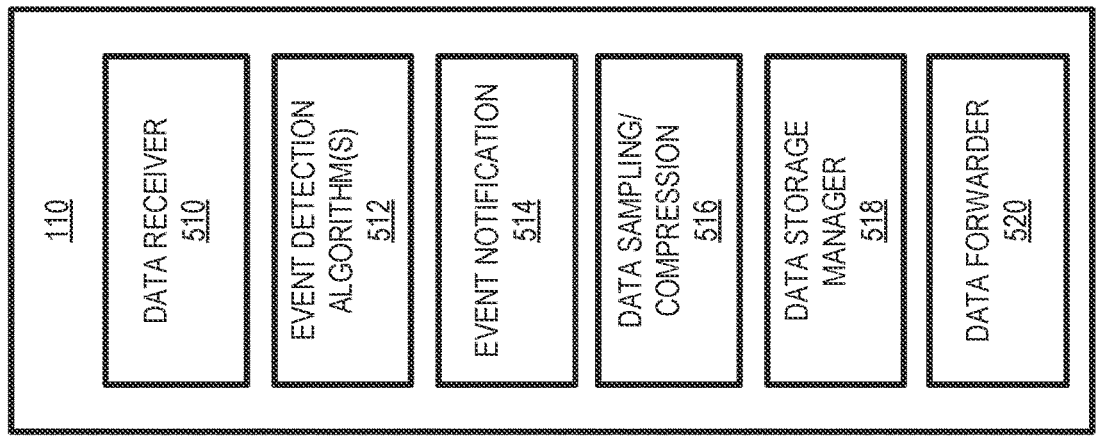
FIG. 5A is a block diagram of logical components of the embedded historian of FIG. 1.

FIG. 5A is a block diagram illustrating exemplary logical components of embedded historian 110, and FIG. 5B is a block diagram illustrating exemplary logical components of local historian 120. The functions described in connection with FIGS. 5A and 5B may be performed by one or more components of device 400 (FIG. 4). Some or all of the logical blocks of FIGS. 5A and 5B may be included, for example, in an application (e.g., software 435), stored in memory 430 and executed by processor 420. Other logical blocks of FIGS. 5A and 5B may be included as a hardware component (e.g., processor 410).

As shown in FIG. 5A, embedded historian 110 may include a data receiver 510, event detection algorithms 512, event notification logic 514, data sampling/compression logic 516, a data storage manager 518, and a data forwarder 520. As shown in FIG. 5B, local historian 120 may include a data receiver 530, event detection algorithms 532, event notification logic 534, data sampling/compression logic 536, a data storage manager 538, a data forwarder 540, and a presentation interface 542. Other configurations may be implemented. Therefore, embedded historian 110 and local historian 120 may include additional, fewer and/or different logical components than those depicted in FIGS. 5A and 5B.

Referring to FIG. 5A, data receiver 510 may receive data from data producer 105. According to an implementation, data receiver 510 may receive data via a direct link at a native resolution from data producer 105 (e.g., a particular controller, component, or sensor).

Event detection algorithms 512 may include definitions and responses for events related to a particular data producer 105 (e.g., the particular controller, component, or sensor providing data to data receiver 510). Event detection algorithms 512 may include thresholds, hysteresis settings, or other values that may indicate a local event or abnormality. Event detection algorithms 512 may also define responses to each defined event, such as identifying particular variables for which native resolution data will be forwarded.

Event notification logic 514 may apply information in event detection algorithms 512 to detect events and signal local historian 120 when an event occurs. For example, event notification logic 514 may detect data values above a pre-set threshold and notify data forwarder 520 and local historian 120. In another implementation, event notification logic 514 may receive an event notification from another component (e.g., local historian 120) and notify data forwarder 520.

Data sampling/compression logic 516 may apply data compression and/or conversion techniques to convert input native resolution data from data producer 105 (e.g., native resolution data 201) to medium resolution data that can be forwarded to local historian 120 (e.g., medium resolution data 215). For example, data sampling/compression logic

516 may be configured to select every nth data point from native resolution time-series data for forwarding to local historian 120. In another implementation, data sampling/compression logic 516 may select only data for some variables from the native resolution data for forwarding. In still another implementation, data sampling/compression logic 516 may combine information from multiple input variables in native resolution data for an output variable for forwarding/publication.

Data storage manager 518 may manage a circular buffer for native resolution data received from data producer 105. For example, data storage manager 518 may store time-series data from data producer 105 at a native resolution and overwrite oldest data when the memory capacity is reached.

Data forwarder 520 may forward data to local historian 120. Under normal conditions, data forwarder 520 may forward sampled data (e.g., medium resolution data 215) based on data sampling/compression logic 516. Upon notification of an event (e.g., from event notification logic 514), data forwarder 520 may immediately begin forwarding to local historian 120 incoming native resolution data for selected variables (e.g., as determined by event detection algorithms 512) and forward stored native resolution data for those selected variables. Additionally, data forwarder 520 may continue to forward other data at a medium resolution (e.g., for variables not specified by the event detection algorithm 512). Data forwarder 520 may also monitor status of the network link 140-1 and buffer the queued data as necessary to ensure successful data delivery.

Referring to FIG. 5B, data receiver 530 may receive data from embedded historians 110. According to an implementation, under normal conditions, data receiver 530 may receive data via a local network link (e.g., link 140-1) at a medium resolution (e.g., medium resolution data 215). Upon notification or detection of an event, data receiver 530 may receive relevant native resolution data (e.g., relevant native resolution data 240) from embedded historian 110 along with other medium resolution data.

Event detection algorithms 532 may include definitions and responses for events related to one or more data producers 105. Event detection algorithms 532 may include thresholds, hysteresis settings, data combinations, or other values that may indicate a local or system event. An event can be configured as a "trigger" based on user-defined factors such as criticality and operating state. A complex trigger can be created by combining multiple events and conditions. Event detection algorithms 532 may also define responses to each event, such as identifying particular variables for which native resolution data will be forwarded by particular embedded historians 110.

Event notification logic 534 may apply information in event detection algorithms 532 to detect events and signal embedded historians 110 when an event occurs. For example, event notification logic 534 may detect data values above a pre-set threshold and notify data forwarder 540 and relevant embedded historians 110. In another implementation, event notification logic 534 may receive an event notification from another component (e.g., embedded historians 110, user input, etc.) and notify data forwarder 540. In another implementation described further below, event notification logic may apply event criteria for a particular time period based on input to presentation interface 542.

Data sampling/compression logic 536 may apply data compress techniques to convert medium resolution data from embedded historians 110 (e.g., medium resolution data 215) to low resolution data that can be forwarded to central historian 130 (e.g., low resolution data 230). For example, data sampling/compression 536 may be configured to select every nth data point from medium resolution time-series data for forwarding to central historian 130. As another example, data sampling/compression logic 536 may compute different output variables based on the input from medium resolution data 215. Data storage manager 538 may manage local memory for medium resolution data received from data producer 105.

Data forwarder 540 may forward data to central historian 130. Under normal conditions, data forwarder 540 may forward sampled data (e.g., low resolution data 230) based on data sampling/compression logic 536. Upon notification of an event (e.g., from event notification logic 534), data forwarder 540 may immediately begin forwarding to central historian 130 incoming native resolution data received from embedded historians 110 and forward stored medium resolution data for selected variables. Additionally, data forwarder 540 may continue to forward other data at a low resolution (e.g., for variables not specified by the event detection algorithm 532). Data forwarder 540 may also monitor status of the network link 140-2 and buffer the queued data as necessary to ensure successful data delivery.

Presentation interface 542 may enable presentation and configuration of local historian 120 and embedded historians 110. For example, if a user desires to share higher resolution data despite the lack of an active event trigger, presentation interface 542 will allow for selection of a time window of interest and creation of an annotated event which will then trigger an event-based high resolution data override. Presentation interface 542 may also provide a graphical interface to present selected data received from embedded historian 110.

Although FIGS. 5A and 5B shows exemplary logical components of embedded historian 110 and local historian 120, in other implementations, embedded historian 110 and local historian 120 may include fewer logical components, different logical components, or additional logical components than depicted in FIGS. 5A and 5B. For example, in another implementation, embedded historian 110 may not include event detection algorithms 512 or event notification logic 514. Additionally or alternatively, one or more logical components of embedded historian 110 and local historian 120 may perform functions described as being performed by one or more other logical components.

FIGS. 6 and 7 are flow diagram of processes for providing context-adaptive resolution for transfer of control system data, according to implementations described herein. According to one implementation, process 600 of FIG. 6 may be performed by embedded historian 110, and process 700 of FIG. 7 may be performed by local historian 120. In another implementation, process 600/700 may be performed by one or more of embedded historian 110 and local historian 120 in conjunction with central historian 130.

As shown in FIG. 6, process 600 may include receiving time-series data from one or more data producers (block 610) and storing the time-series data at a native resolution (block 620). For example, according to one implementation, embedded historian 110 may receive data from a data producer 105. Embedded historian 110 (e.g., data storage manager 518) may store time-series data from data producer 105 at a native resolution, overwriting oldest data when the buffer capacity is reached.

Process 600 may also include determining output variables from the input data (block 630) and publishing the data for the output variables at medium resolution (block 640). For example, embedded historian 110 (e.g., data sampling/compression logic 516) may apply data compression and/or conversion techniques to convert native resolution data from data producer 105 (e.g., native resolution data 201) to medium resolution data that can be forwarded to local historian 120 (e.g., medium resolution data 215). Under normal conditions, embedded historian 110 (e.g., data forwarder 520) may forward sampled data (e.g., medium resolution data 215) based on data sampling/compression logic 516.

Process 600 may further include determining if there is an event trigger (block 650). For example, embedded historian 110 (e.g., event notification logic 514) may apply information in event detection algorithms 512 to detect events and signal local historian 120 when an event occurs. In another implementation, embedded historian 110 may receive an event notification from another component (e.g., local historian 120).

If an event trigger is detected (block 650—Yes), process 600 may include re-publishing data for relevant variables from stored time-series data at native resolution (block 660), and publishing relevant variables from incoming time-series data at native resolution (block 670). For example, upon notification of an event, embedded historian 110 (e.g., data forwarder 520) may forward the stored native resolution data for selected variables that are identified as relevant to the event (e.g., based on event detection algorithms 512). Also, embedded historian 110 (e.g., data forwarder 520) may immediately begin forwarding to local historian 120 incoming native resolution data for the selected variables For example, data forwarder 520 may forward the highest available resolution data for a set period of time after the event notification (e.g., as defined in event detection algorithms 512).

If an event trigger is not detected (block 650—No), process 600 may return to block 630 to continue to store the time-series data. While some portions of the flow diagram in FIG. 6 are represented as a sequential series of blocks, in other implementations, different blocks may be performed in parallel or in series. For example, in one implementation, normal output at medium resolution may continue while native resolution data is being published for selected variables.

Referring to FIG. 7, process 700 may include receiving medium resolution time-series data from an embedded historian (block 710) and storing the time-series data at the medium resolution (block 720). For example, according to one implementation, local historian 120 may receive data from embedded historian 110. Local historian 120 (e.g., data storage manager 538) may store the time-series data at the medium resolution.

Process 700 may also include determining output variables from the medium resolution data (block 730) and publishing the data for the output variables at low resolution (block 740). For example, local historian 120 (e.g., data sampling/compression logic 536) may apply data compression and/or conversion techniques to convert medium resolution data from embedded historian 110 (e.g., medium resolution data 215) to low resolution data that can be forwarded to central historian 120 (e.g., low resolution data 230). Under normal conditions, local historian 120 (e.g., data forwarder 540) may forward sampled data based on data sampling/compression logic 536.

Process 700 may further include determining if there is an event trigger (block 750). For example, local historian 120 (e.g., event notification logic 534) may apply information in event detection algorithms 532 to detect events and signal embedded historian 110 when an event occurs. In another implementation, local historian 120 may receive an event notification from another component (e.g., embedded historian 110).

If an event trigger is detected (block 750—Yes), process 700 may include re-publishing data for relevant variables from stored time-series data at the medium resolution (block 760), and receiving and forward incoming time-series data from embedded historian at native resolution (block 670). For example, upon notification of an event, local historian 120 (e.g., data forwarder 540) may forward the stored medium resolution data for selected variables that are identified as relevant to the event (e.g., based on event detection algorithms 512). Data forwarder 540 may forward the stored medium resolution data for a predetermined period prior to the event notification (e.g., as defined in event detection algorithms 532). Also, local historian 120 (e.g., data forwarder 540) may receive and immediately begin forwarding to central historian 130 incoming native resolution data that is being provided by embedded historian 110 in response to the event notification.

If an event trigger is not detected (block 750—No), process 700 may return to block 730 to continue to store the time-series data. While some portions of the flow diagram in FIG. 7 are represented as a sequential series of blocks, in other implementations, different blocks may be performed in parallel or in series. For example, in one implementation, normal output at low resolution may continue while medium and/or native resolution data is being published for selected variables.

Systems and methods described herein use context-adaptive resolution to achieve lossless transfer of critical industrial control system data. Bandwidth and storage optimization is achieved for time-series data generated or collected by an industrial control system and transmitted through a network to a remote historian system. The control system may be implemented through one or more embedded historians and local historians. The control system continuously processes input data, computes output variables, and generates an event trigger when a set of variables meet pre-defined set of conditions. When there are no active event triggers, the control system publishes time-series data for a pre-defined set of variables at a lower resolution to conserve bandwidth and storage. When an event trigger is activated, the control system publishes recent and current time-series data for a subset of the variables to subscribers at a higher resolution.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Although the invention has been described in detail above, it is expressly understood that it will be apparent to persons skilled in the relevant art that the invention may be modified without departing from the spirit of the invention. Various changes of form, design, or arrangement (e.g., use in capacity control, speed control, or other control applications) may be made to the invention without departing from the spirit and scope of the invention.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420). Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

What is claimed is:

1. A system comprising:
    an embedded historian device configured to:
        receive input data from a data producer at a first resolution,
        compute output variables based on the input data,
        store, in a memory, the input data at the first resolution,
        publish, to a local historian device, time-series data of the output variables using a local network link at a second resolution, wherein the second resolution is lower than the first resolution, wherein the local historian device is configured to publish, to a central historian device, the time series data at a third resolution, and wherein the third resolution is lower than the second resolution, wherein the local historian is configured to store the published time-series data of the output variables at the second resolution,
        identify an event when the output variables meet a set of conditions, and
        publish, in response to identifying the event, a portion of the time-series data, for a subset of the output variables, at the first resolution, wherein the portion of the time-series data includes at least data obtained prior to a time of the event, wherein the local historian device is further configured to re-publish, in response to identifying the event, a portion of the stored time-series data at the second resolution, and wherein the central historian device is configured to:
            receive, from the embedded historian device, the portion of the time-series data published at the first resolution;
            receive, from the local historian device, the portion of the time-series data re-published at the second resolution; and
            merge the portion of the time-series data published at the first resolution, the portion of the time-series data re-published at the second resolution, and the published time series data at the third resolution, wherein the merging forms adaptive resolution time-series data.

2. The system of claim 1, wherein, when publishing the portion of the time-series data, the embedded historian device is further configured to:
    publish to one of the central historian device or the local historian device.

3. The system of claim 1, wherein the memory includes a circular buffer whose oldest data is overwritten upon reaching capacity.

4. The system of claim 3, wherein, when publishing after identifying the event, the embedded historian device is further configured to:
    retrieve, from the circular buffer, a portion of the time-series data preceding the time of the event.

5. The system of claim 1, wherein, when detecting the event, the embedded historian device is further configured to:
    select the subset of the output variables based on their correlation to the event.

6. The system of claim 1, wherein the time-series data at the first resolution includes time-series data with intervals of 10 milliseconds or less, and wherein the time-series data at the second resolution includes time-series data with intervals of at least 100 milliseconds.

7. The system of claim 1,
    wherein the portion of the time-series data, at the second resolution, includes data obtained prior to the time of the event.

8. The system of claim 1, wherein each data point in the time-series data includes a data value and a corresponding timestamp.

9. A method, comprising:
    receiving, by an embedded historian device of a control system, input data from a data producer at a first resolution;
    storing, in a memory of the embedded historian device, the input data at the first resolution;
    computing, by the embedded historian device, output variables based on the input data;
    publishing, by the embedded historian device and to a local historian device, time-series data of the output variables using a local network link at a second resolution, wherein the second resolution is lower than the first resolution, wherein the local historian device is configured to publish, to a central historian device, the time series data at a third resolution, and wherein the third resolution is lower than the second resolution, and wherein the local historian is configured to store the published time-series data of the output variables at the second resolution;
    identifying, by the embedded historian device, an event when the output variables meet a set of conditions; and
    publishing, by the embedded historian device and in response to identifying the event, a portion of the time-series data, for a subset of the output variables, at the first resolution, wherein the portion of the time-series data includes at least data obtained prior to a time of the event, wherein the local historian device is further configured to re-publish, in response to identifying the event, a portion of the stored time-series data at the second resolution, and wherein the central historian device is configured to:

receive, from the embedded historian device, the portion of the time-series data published at the first resolution;

receive, from the local historian device, the portion of the time-series data re-published at the second resolution; and merge the portion of the time-series data published at the first resolution, the portion of the time-series data re-published at the second resolution, and the published time series data at the third resolution, wherein the merging forms adaptive resolution time-series data.

10. The method of claim 9, wherein the different portion of the time-series data includes data obtained after the time of the event.

11. The method of claim 9, wherein storing the time-series data at the first resolution includes storing a sequence of the input data in a circular buffer, and wherein storing the sequence of the input data results in overwriting oldest data upon reaching a capacity.

12. The method of claim 9, wherein publishing the portion of the time-series data at the first resolution further comprises one of:

selecting the subset of the output variables based on their correlation to the event, or selecting the subset of the output variables based on a pre-defined response to the event.

\* \* \* \* \*